(12) United States Patent
Lushear et al.

(10) Patent No.: US 9,001,685 B1
(45) Date of Patent: Apr. 7, 2015

(54) BI-DIRECTIONAL REAL-TIME DATA CONNECTION TROUBLESHOOTING

(71) Applicant: Sprint Communications Company L.P., Overland Park, KS (US)

(72) Inventors: Brian Lushear, Winter Springs, FL (US); Todd Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 140 days.

(21) Appl. No.: 13/831,494

(22) Filed: Mar. 14, 2013

(51) Int. Cl.
*H04M 15/00* (2006.01)
*H04J 1/16* (2006.01)
*H04L 12/24* (2006.01)

(52) U.S. Cl.
CPC .................................. *H04L 41/5025* (2013.01)

(58) Field of Classification Search
USPC .............. 370/229–238.1, 252, 253, 389, 391, 370/392, 396, 395.21, 395.3, 395.4, 370/395.41–395.43, 395.64, 432, 444, 445, 370/468; 709/207, 240; 379/114.01, 379/114.06, 114.07, 161, 208.01
See application file for complete search history.

(56) References Cited

U.S. PATENT DOCUMENTS

| | | | | |
|---|---|---|---|---|
| 8,116,224 | B2* | 2/2012 | Bugenhagen | 370/252 |
| 8,279,759 | B1* | 10/2012 | Jones | 370/248 |
| 2012/0169494 | A1* | 7/2012 | Grillo et al. | 340/540 |
| 2012/0257535 | A1* | 10/2012 | Dewath et al. | 370/253 |

* cited by examiner

*Primary Examiner* — Awet Haile (57) ABSTRACT

A method of troubleshooting a communication service is disclosed. The method comprises creating an association between a customer premise equipment (CPE) in a customer network and a communication service provider router providing the communication service. The method also comprises determining a CPE configuration of the CPE in the customer network and a router configuration of the communication service provider router providing communication services to the CPE based on the association. The method also comprises determining CPE measurements associated with the CPE and router measurements associated with the router based on the association, and determining whether the CPE measurements and the router measurements are normal based on an analysis of the CPE configuration and the router configuration. The method then identifies a cause of the abnormal measurements, determines a corrective action for the identified cause, and issue a trouble ticket indicating the cause and the corrective action.

18 Claims, 4 Drawing Sheets

BI-DIRECTIONAL REAL-TIME DATA CONNECTION TROUBLESHOOTING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An enterprise or business customer may subscribe to a variety of communication services provided by one or more service providers who operate owned or leased telecommunications equipment. The service provider may allocate common resources of the service provider's telecommunications equipment to a particular customer, while other of the common resources are assigned to other customers. The resources allocated by the service provider to the customer are configured at the service provider's side in accordance with an agreement between the service provider and the customer based on a communication service requested by the customer. The customer premises equipment (CPE) is configured at the customer's side in accordance with an agreement for interfacing with the service provider's equipment at the service provider's side to allow access to the communication service.

The enterprise or business customer's CPE may obtain connectivity to the communication service via a port on a router operated by the communication service provider. The port on the router may be dedicated or reserved primarily or completely for the use of the customer. A router is an electronic device that provides connectivity between two networks and typically supports routing of data packets to other network nodes based on addresses embedded in the header of the data packets.

Communication services may be defined, at least in part, by a service level agreement (SLA) that may define a class of service, a bandwidth, and other key communication parameters. A SLA may also define service availability, time to identify the cause of a customer affecting malfunction, time to repair a customer affecting malfunction, service provisioning time, and other. A quality of service (QoS) and/or a class of service associated with the communication service may be implied by the SLA.

SUMMARY

In an embodiment, a method is disclosed. The method comprises determining a CPE configuration of the CPE in the customer network and a router configuration of the communication service provider router providing communication services to the CPE based on the association, initiating network tests on a CPE interface of the CPE and network tests on a router interface of the router simultaneously, wherein the CPE interface and the router interface are configured for the communication service, and collecting CPE measurements and router measurements generated by the tests initiated on the CPE interface and the tests initiated on the router interface. The method further comprises determining a difference between the collected CPE measurements and router measurements, determining whether the difference exceeds a normal threshold, and in response to determining that the difference exceeds the normal threshold, identifying a cause of the difference by applying a set of rules to verify the communication service is configured properly.

In an embodiment, a communication service troubleshooting tool is disclosed. The communication service troubleshooting tool comprises instructions stored in memory which, when executed by a processor, perform the steps of creating an association between the CPE and the router, determining a CPE configuration of the CPE in the customer network and a router configuration of the router in the communication service provider network providing communication services to the CPE based on the association, and determining CPE measurements associated with the CPE and router measurements associated with the router based on the association. The communication service troubleshooting tool further comprises determining whether the CPE measurements and the router measurements are normal based on an analysis of the CPE configuration and the router configuration, and in response to determining that the CPE measurements and the router measurements are not normal, identifying a cause of the abnormal measurements.

In an embodiment, a system is disclosed. The system comprises a customer premises equipment (CPE) residing in a customer network, and a router residing in a communication service provider network, the router providing communication services to the CPE. The system further comprises a communication service troubleshooting tool wherein the communication service troubleshooting tool creates an association between the CPE and the router, determines a CPE configuration of the CPE in the customer network and a router configuration of the router in the communication service provider network providing communication services to the CPE based on the association, determines CPE measurements associated with the CPE and router measurements associated with the router based on the association, determines whether the CPE measurements and the router measurements are normal based on an analysis of the CPE configuration and the router configuration, and in response to determining that the CPE measurements and the router measurements are not normal, identifying a cause of the abnormal measurements.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system, method, and tool for providing real-time bi-lateral troubleshooting of a communication service provisioned to a customer premises equipment (CPE) by a communication service provider. A service provider may provide communication services to customers. When the communication service is provisioned by the service provider, not only is the service provider's equipment configured to support the customer, but the customer's equipment may also be configured to interact with the service provider's equipment providing the communication service. In an embodiment, an interface to the customer premises equipment (CPE) may be configured to support the communication service provided by the service provider. In the course of operation, a customer may notice an issue associated with the communication service. In one instance, the customer may observe a performance level of the communication service that does not meet an agreed upon performance level, for example, a performance level specified in a service level agreement (SLA) with the service provider. In another instance, the customer may merely suspect an issue associated with the communication service. In that case, the customer may want to verify if the suspected problem actually exists.

When a customer observes or suspects a problem with a communication service, it can be difficult to identify the location of the problem, and consequently, it may be difficult to identify the cause of the problem. For instance, the problem may be at the CPE on the customer side, or the problem may occur at any point between, and including, the CPE at the customer side and the router at the service provider side. However, it may not be possible to isolate any issues unless both sides are analyzed together, or bi-laterally. Accordingly, if a test is run on the customer interface, it may appear that the CPE is performing as desired. On the other hand, if a test is run on the service provider interface, it may appear that the router is also performing as desired. However, it is not until both sets of test results are compared and analyzed that a problem may be detected, or conversely, that the system is performing as intended and no problem exists.

Bi-laterally troubleshooting a communication service provides a way to test and troubleshoot a communication service from both the customer side and the service provider side at the same time. A method, tool, or system for bi-lateral troubleshooting may determine configuration parameters associated with a communication service configured at the customer side and the service provider side. Tests may be initiated simultaneously on the customer side and the service provider side and measurements collected. The measurements may then be analyzed and compared to determine if the communication service is performing at the customer side and service provider side as described in the SLA or if there are discrepancies in the measurements. A difference in measurements at the customer side and the router side may be indicative that the two sides are not treating data traffic the same for the same communication service. By analyzing measurements from both sides and the differences, in conjunction with configuration parameters, mismatches in configuration parameters may be detected and identified as a cause of the problem thereby leading to a quicker resolution of a customer problem.

Troubleshooting a communication service bi-laterally from both sides of the communication path over which the communication service is provided allows detection of problems caused by a mismatch in configuration of the communication service at both ends of the communication path. Conversely, bi-lateral troubleshooting may confirm that both sides of the communication path are configured properly. These bi-lateral troubleshooting results may lead to confirmation that the communication service is performing as intended or point to cause of the problem other than a mismatch of configuration parameters, thus providing an improved troubleshooting mechanism over one in which each side of a communication path is tested in isolation of the other.

In an embodiment, the two interfaces to be tested and analyzed may be, but are not necessarily, the customer side and the service provider side, as described above. The two interfaces may include a customer interface at one customer wide area network (WAN) site and a customer interface at another customer WAN site, where the customer may want to test not only the separate interfaces at each site, but how the interfaces are interacting together.

Figure 1:
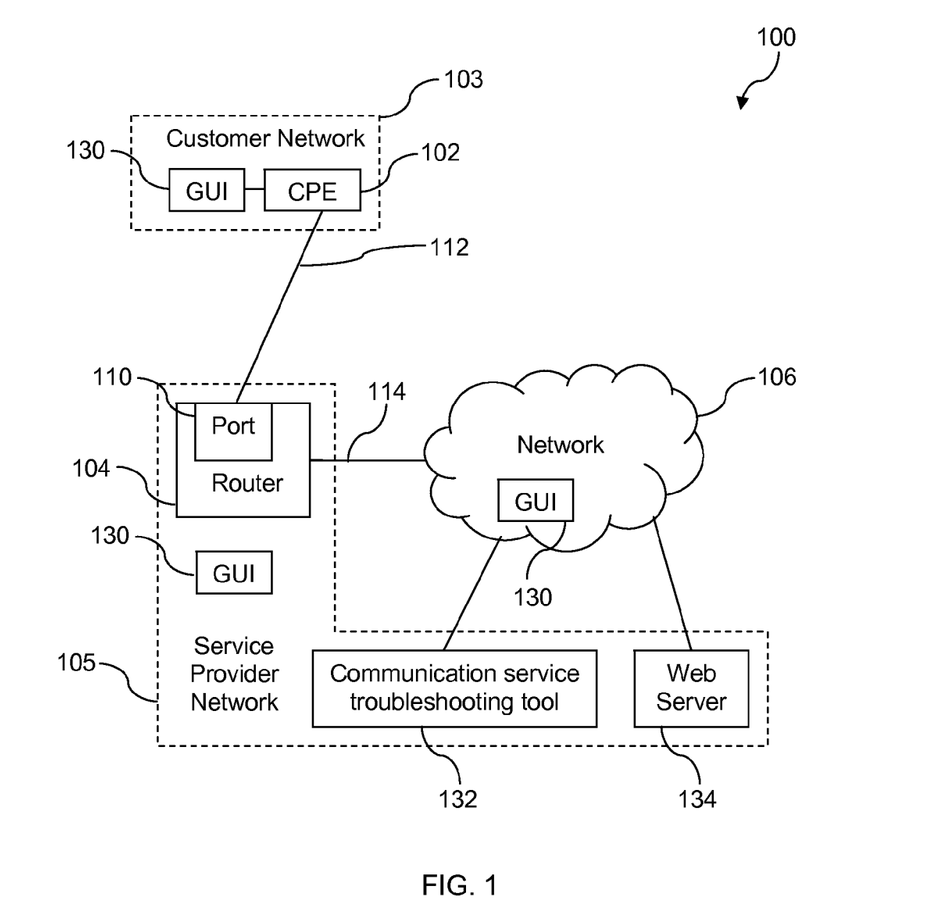
FIG. 1 illustrates an exemplary system for providing a communication service troubleshooting tool.

Turning now to FIG. 1, a system 100 is discussed that illustrates one or more embodiments of the disclosure. The system 100 includes customer premises equipment (CPE) 102 in communication with a router 104 that provides connectivity to the network 106 to the CPE 102. The CPE 102 may be located in the customer network 103. The router 104 may be located in a communication service provider network 105, also referred to as service provider network. The internet connectivity or other communication service may be provided by a port 110 on the router 104. The port 110 may be dedicated to the use of the CPE 102 or may be shared by a plurality of CPEs.

The communication service may be provided, in part, over a communication path 112. In an embodiment, the communication path 112 may be provided between the CPE 102 and the router 104. The router 104 may provide access to the communication service, for example, network 106 via link 114. Network 106 may comprise one or more private networks, one or more public networks, or a combination thereof. The network 106 may comprise a portion of the Internet or be communicatively coupled to the Internet. Thus, the CPE 102 may access the network 106, for example, to access content from a content server (not shown) via the communication path 112 from the CPE 102 to the router 104.

The communication path 112 is established between a first interface at CPE 102 and a second interface at the router 104. In an embodiment, one or both of the CPE 102 and router 104 interfaces may be a wired interface. In an embodiment, a wired interface may be an Ethernet interface or other standard wired interface. In another embodiment, one or both of the CPE 102 and router 104 interfaces may be wireless interfaces. In an embodiment, the CPE interface may be wireless and the router interface may be wired. Further, while the communication service is promoted by the Internet connectivity, a variety of different communication services may be provided by such Internet connectivity. The communication service may include one or more of VPN service, email service, multimedia communication service, video conferencing service, voice communication service, and other communication services.

While a single communication path 112 is depicted in FIG. 1, in some embodiments, multiple communication paths 112 may be employed to provide the communication service, for example, depending on the communication volume associated with the communication service. In some embodiments, multiple communication paths 112 may be supported by one port 110 of the router 104. In another embodiment, depending on the communication volume associated with the communication service, multiple communication paths 112 may be supported by two or more ports 110 of the router 104.

The CPE 102 is located in the customer network 103 and may comprise a gateway, a hub, a modem, or other device for promoting data communications. The CPE 102 may be linked to a local area network (LAN) (not shown) in the customer network 103 that connects a plurality of computers within the customer network 103. The CPE 102 may provide devices or computers communicatively coupled to the CPE 102 with access to the network 106 via the communication service. In another embodiment, however, the CPE 102 may be different from the above described exemplary configuration.

A graphical user interface (GUI) 130 provides access to a troubleshooting tool 132. The GUI may be used to access the troubleshooting tool from the customer network 103, the service provider network 105, or any network 106. The GUI 130 may be presented on a display linked to a variety of computers and work stations in the customer network 103. In an embodiment, the GUI 130 may provide one or more buttons that select an asynchronous JAVASCRIPT request (AJAX) to be sent to a web server 134 via the communication links, for example, from the computer presenting the GUI 130 over a LAN communication link to the CPE 102, over the communication path 112 to the port 110 of the router 104, over link 114 to the network 106, and via the network 106 to the web server 134. The AJAX message may include one or more queries related to the status of the communication service, the communication path 112, the router 104, and/or the port 110. For example, the status queries may include an interface status query, a QoS status query, a connectivity status query, a latency query, and other status queries. Based on the response to these status queries, the customer may obtain a transparent view into the communication service that enables them to verify, maintain, and troubleshoot the communication service. Furthermore, access to troubleshooting tool 132 via GUI 130 is not limited to customers from a customer network. In an embodiment, customer and service providers may utilize troubleshooting tool 132. In an embodiment, GUI 130 may be similarly provided to a network provider for accessing troubleshooting tool 132 from the service provider network 105. In yet another embodiment, GUI 130 may be provided in any network 106 to allow either a customer, a service provider, or both to access the troubleshooting tool 132.

In an embodiment, key operational parameters or information related to the communication path 112, the router 104, and/or the port 110 may be displayed highlighted, bolded, or otherwise emphasized in the GUI 132 to aid in assimilating the information provided. However, these status queries are uni-directional. That is, the status queries initiated at the GUI 132 may collect information with respect to the communication path 112, the router 104, and/or the port 110 associated with a communication service from the perspective of the service provider's interface. Alternatively, the status queries initiated at the GUI 130 may collect information related to the communication service based on queries made to the CPE 102 on the customer network side. However, because a communication path has at least two endpoints and the information collected by the status queries is associated with only one end of the communication path, that is, either from the customer side or the service provider side, the information may be considered to be uni-directional.

The troubleshooting tool 132 is provided to collect and analyze bi-directional information, that is, information associated with both the customer side and the service provider side. This information may be measured or collected in real-time, that is, the information is measured or collected from data traffic as the data traffic is being transmitted or received, and analyzed as soon as possible after the information is collected for both sides. Said in another way, the term real-time as used herein means that the information is measured, collected, transmitted, and analyzed as events happen versus performing one or more of these actions in a batch processing mode of operation. In an embodiment, real-time measurement, collection, transmission, and analysis of information related to an event may take place in less than 10 seconds, in less than one minute, in less than five minutes, or in less than fifteen minutes. The information collected may be in the form of measurements. For instance, the troubleshooting tool 132 may execute on a general purpose computer system in the service provider network 105 and may send a simple network management protocol (SNMP) message to the router 104 and/or to the port 110 to request appropriate data in reply to the status queries. The SNMP message may request current values of operational parameters or measurements of the performance of the communication service at the router 104 and/or the port 110, for example a current queue depth, an average queue depth, a maximum queue depth, an offered throughput rate, a packet drop rate, incoming packet rate, number of incoming packets, outgoing packet rate, number of outgoing packets, and other parameters. Additionally, the SNMP message may request current values of a variety of counters, for example an input error counter, an output error counter, an input packet discard counter, an output packet discard counter, an interface resets counter, a carrier transitions counter, and other well-known counters. This process of obtaining values of counters and operational parameters of the router 104 and/or the port 110 may be referred to as polling the router 104 and may be accomplished by using the SNMP protocol or by another method. Other methods of obtaining the operational information from the router 104 and/or the port 110 are contemplated by this disclosure. In an embodiment, the troubleshooting tool 132 may interact or interface with other platforms to initiate tests and/or collect measurement from the other platforms to use while troubleshooting a communication service.

The collected parameters and measurements may be used for analyzing a communication path 112 bi-directionally. In an embodiment, the parameters and/or measurements may first be collected from each side of the communication path 112 by the troubleshooting tool 132, that is, from both the CPE on the customer side of the communication path 112 and router 104 on the service provider side of the communication path 112. The measurements may be collected over a certain period of time, e.g. the number of packets dropped or the number of packets received in the last five minutes. Because collection of the measurements at CPE 102 is independent of collection of measurements at router 104, the five minute interval for CPE 102 may have a different start time and stop time than the five minute interval at router 104. For example, the five minute time interval may be a sliding window.

A CPE 102 may be managed or unmanaged by the service provider. In an embodiment, the service provider may initiate bi-lateral troubleshooting by identifying either a managed CPE 102 or port 110. In an embodiment, the device ID of managed CPE 102 may be selected first. After the device ID of managed CPE 102 is selected, the port ID 110 of router 104 may be readily available from the service provider's configuration information. In another embodiment, a port ID 110 of router 104 may be selected first. The device ID of managed CPE 102 may be readily available from the service provider's configuration information for that site. The CPE 102 may also be identified by an IP address, device name, or other information configured by the service provider that may identify the managed device CPE 102.

In an embodiment, after the CPE 102 and port 110 are selected, the troubleshooting tool 132 may perform status queries on each of the CPE 102 interface and the router 104 interface. The information collected from the CPE 102 interface and port 110 interface may then be analyzed bi-directionally on a real-time basis. By performing a bi-directional analysis, the service provider may be able to detect issues with the site that may not be gleaned from looking at either CPE 102 or port 110 individually. In an embodiment, a problem with the performance of the communication service may be associated with a mismatch of configuration parameters between CPE 102 and port 110. In another embodiment, the analysis may reveal that the configuration information is correct and the communication service is performing as intended.

Figure 2:
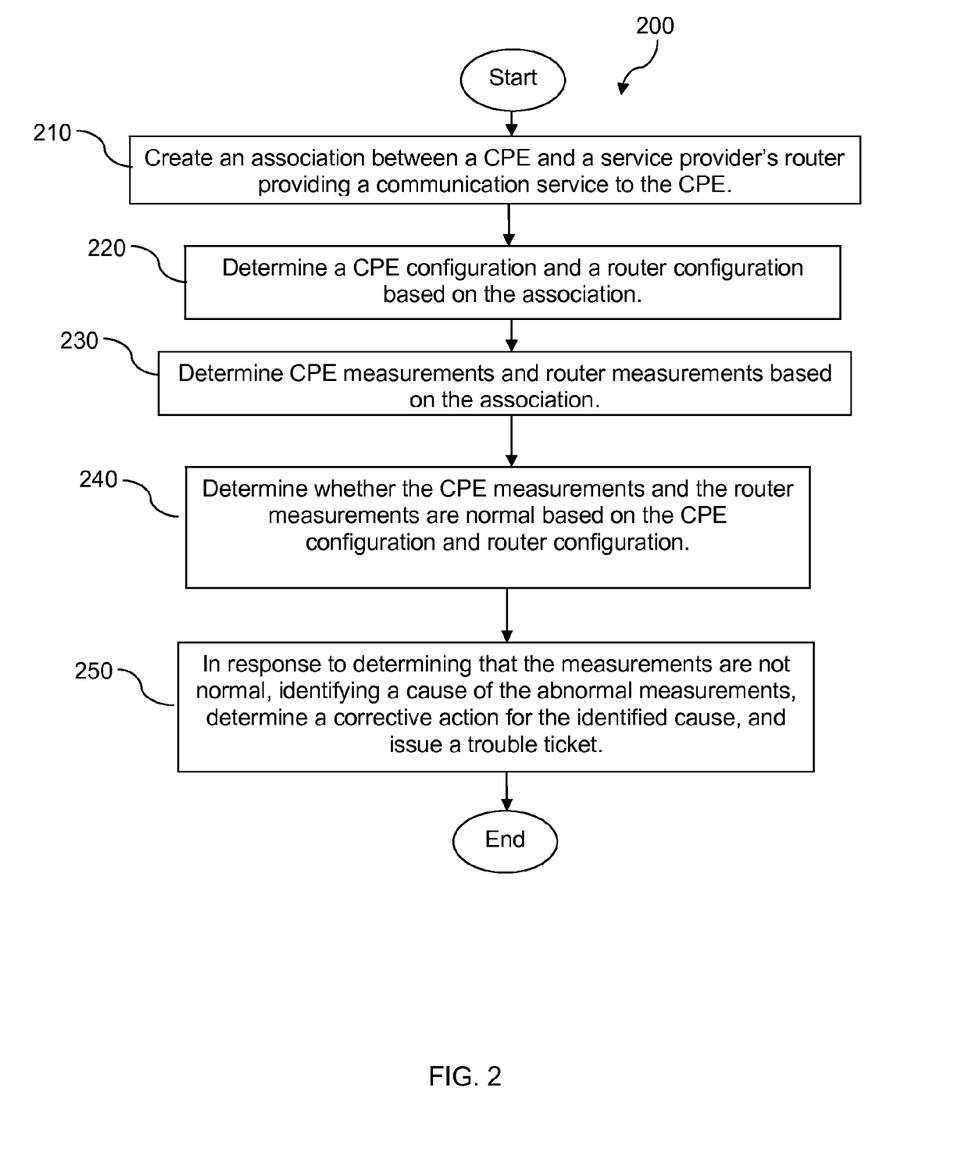
FIG. 2 illustrates an exemplary method for troubleshooting a communication service.

Turning now to FIG. 2, a flow chart of exemplary method 200 for troubleshooting a communication service is described. The method 200 begins at block 210 where an association is created between customer premises equipment (CPE) 102 and a communication service provider router 104 providing the communication service. In an embodiment, the association is created between devices comprising a site. In an embodiment, the association is created between a device ID of CPE 102 and a port 110 of router 104. It is contemplated, however, that an association may be created between two devices based on any information that identifies the two devices comprising a customer site or otherwise identifies the two endpoints of a communication path providing a communication service. In another embodiment, an association may be created between two customer sites of the customer's wide area network (WAN) using information that identifies one or more customer sites.

In block 220, the method determines a CPE configuration of the CPE in the customer network. The method also determines a router configuration of the communication service provider router providing communication services to the CPE based on the association. The CPE configuration and the router configuration identify configuration settings established by the communication service provider when the customer subscribed to the communication service. The configuration settings may be set according to a service level agreement (SLA) agreed upon when the customer subscribed to the communication service. Configuration settings associated with an SLA may be communication service dependent and may include an IP subnet address, Point-to-Point (PPP) multilink fragmentation information, encapsulation type, class of service, interface scrambling parameter for a serial interface, or any other information configured by the service provider to provide a communication service to the customer.

In an embodiment, the configuration settings for the CPE 102 may desirably match the configuration settings for port 110. Thus, after the configuration settings are determined for each side, the method compares each parameter of the CPE configuration against the corresponding parameter of the router configuration to determine whether the communication path between the two interfaces has been configured to perform as specified in the SLA. For example, configuration parameters for multilink fragmentation, encapsulation type, class of service, and interface scrambling at CPE 102 may desirably match the configuration parameters for multilink fragmentation, encapsulation type, class of service, and interface scrambling at port 110 of the service provider router 104. Generally, these parameters may relate to how data is format-ted and transmitted between CPE 102 and router 104 and if there is a mismatch between the CPE 102 configuration and the router 104 configuration, the performance of the communication service may be hindered. For certain other configuration settings, the parameters may not need to match exactly, but they may desirably meet certain criteria. The configuration information may also be associated with a particular interface type. In an embodiment, for an Ethernet interface, the configuration of duplex transmission settings or virtual local area network (VLAN) settings may also be verified to be set appropriately for the communication service to perform properly over communication path 112.

In an embodiment, an IP address designated in the CPE 102 configuration and the IP address designated in the router 104 configuration may not match, however, the IP addresses should be in the same subnet. In an embodiment, the IP address of CPE 102 and the corresponding IP address of port 110 may be one number off. Even though the IP addresses do no match, this is an acceptable configuration as long as the IP addresses are configured within the same subnet mask. The configuration of IP addresses at the CPE 102 and router 104 provides an example of when matching parameters in the CPE configuration and the router configuration may be problematic. In another embodiment, the configuration parameters may be verified prior to creating an association.

In block 230, the method determines CPE measurements associated with CPE 102 and router measurements associated with the router 104 based on the association. These measurements may also be referred to as performance metrics or performance reports. Measurements may be taken by CPE 102 and router 104 related to a communication service. Measurements may be collected in the normal course of the device functionality and reports may be generated accordingly. The reports may be collected as needed. Measurements may be interface-dependent. In an embodiment, a radio frequency (RF) signal strength may be measured on a wireless interface of communication path 112, whereas RF signal strength may not be an appropriate measurement on an Ethernet interface. In an embodiment, the troubleshooting tool 132 may determine the interface type prior to running a particular test or collecting a particular measurement.

In an embodiment, measurements may be taken on initiation of a command directed to collecting measurements related to an aspect of a communication service. Simple Network Management Protocol (SNMP) commands, ping commands, or other commands that initiate testing or measurement of activity over a communication path in real-time may be invoked to test the communication path and/or collect measurement reports. Measurements may be collected over a period of time. In an embodiment, a measurement report may contain information collected regarding the number of bytes sent by one side of the association and received by the other side of the association during a time interval.

In other embodiments, simultaneous tests are initiated toward both sides, or interfaces, of the communication path. In an embodiment, a command may be initiated that generates traffic from or to the interfaces to be tested and collects measurements associated with that test. In an embodiment, the traffic is generated on both sides of communication path 112 at the same time. Whether to generate traffic on one or both sides of communication path 112 may be an optional testing parameter which may be selected before running a test. Troubleshooting tool 132 is not limited to merely observing or collecting results of a test. In an embodiment, troubleshooting tool 132 may allow manipulation of various test parameters and/or data associated with a test prior to running the test. In an embodiment, the bit pattern of a ping test may be manipulated in order to test a particular aspect of an interface of a communication path. In another embodiment, traffic generated toward either one or both interfaces of a communication path may be manipulated with a particular class of service or quality of service to test various traffic handling queues.

In block 240, the method determines whether the CPE measurements and the router measurements collected in block 230 are normal based on the CPE configuration and the router configuration for the communication service. Measurements may be considered normal if communication service is performing at an acceptable level for the service as configured, and when the service is configured properly. In an embodiment, a number of bytes sent from CPE 102 may be compared with the number of bytes received and processed by router 104. In an embodiment, the method may determine that the number of bytes sent from CPE 102 may not equal the number of bytes received and processed by router 104. However, the communication service may be performing normally if the difference in the number of bytes sent by CPE 102 and the number of bytes received and processed by router 104 is within a certain threshold. In an embodiment, a reason for the difference may be because the interval during which the measurements were collected occurred in different time windows at the CPE 102 than at router 104. In another embodiment, the measurements may indicate that an input rate at the incoming side is 141K bits per second (bps) and the output from the transmitting side is 155K bps. However, those measurements may be within an acceptable margin of error between two independent devices.

In an embodiment, the method may contain a set of rules to apply for comparing the CPE measurements and the router measurements and determining whether the measurements are normal in light of the association created between CPE 102 and router 104. In some instances, a customer may perceive a problem with the performance of the communication service even when the performance is in-line with the SLA for the communication service. In an embodiment, the router 104 may drop packets because the customer requested that traffic from CPE 102 be treated with a particular class of service (CoS) for a particular communication service. In another embodiment, other types of measurements may be compared to determine if the measurements are equal and if the measurements are not equal and further determine if the differences meet the requirements of the SLA, that is, if the measurements are normal. Determining if the requirements of the SLA are being met may include applying the set of rules for troubleshooting a particular communication service.

In yet other embodiments, certain configuration parameters may direct the focus of the troubleshooting. In an embodiment, if the configuration of router indicates multi-link, the configuration of the CPE 102 may be immediately checked to determine whether it is also configured for multi-link. Similar rules may be defined for other configuration parameters which are required to match at both sides. In an embodiment, a priority may be applied to the order in which the configuration parameters are checked and analyzed. Similarly, a priority may be applied to the tests that are initiated to generate traffic and/or collect measurements from the CPE 102 interface and the service provider interface of communication path 112.

In another embodiment, the method may determine that the CPE measurements and router measurements are not normal in light of the association. For example, the difference between certain CPE measurements and the router measurements may exceed a defined threshold. Steps 230 and 240 may be performed iteratively until a problem is identified or until it is determined that the communication service is configured and performing properly in accordance with an SLA. In an embodiment, the results of a test may either be determined to be normal in view of the configuration parameters that are properly configured. In an embodiment, the set of rules may identify a next configuration parameter to verify and/or a next test to initiate. In an embodiment, the next set of test results may be similarly analyzed. The priority applied to certain tests or configuration parameters may be assigned in the set of rules based on the most common network problems encountered, the communication service being tested, the type of interface, or any other criteria which may be relevant to troubleshooting the communication service.

In block 250, in response to the method determining that the CPE measurements and the router measurements are abnormal, the method identifies a cause of the abnormal measurements. In an embodiment, identifying the cause of abnormal measurements may include identifying a configuration mismatch between the CPE configuration and the router configuration. In an embodiment, if router 104 is determined to be dropping an amount of bytes, or packets, from the CPE 102 at an abnormal rate for the class of service defined in the SLA, the method identifies a cause of the abnormal measurements. In an embodiment, the method identifies possible causes of the difference between the number of packets sent from CPE 102 and the number of bytes received and processed at router 104. In an embodiment, the analysis includes examining the resource configuration at the router 104 where the packets are being dropped, identify the queue dropping the packets, and determine whether the queue handling those packets is configured correctly. In an embodiment, the customer may mark packets with a precedence to indicate the class of service handling for the packets. In an embodiment, the troubleshooting analysis may determine that the queue type is configured with a class of service different than the precedence in the marked packets. The mismatch may have resulted in more traffic to be dropped than the class of service indicated in the SLA or for the customer to merely perceive that more traffic was dropped than anticipated. When a mismatch or other cause is identified, the method may then automatically highlight the problem and open a trouble ticket. The service provider may then allocate personnel to quickly correct the identified cause of the problem.

Figure 3:
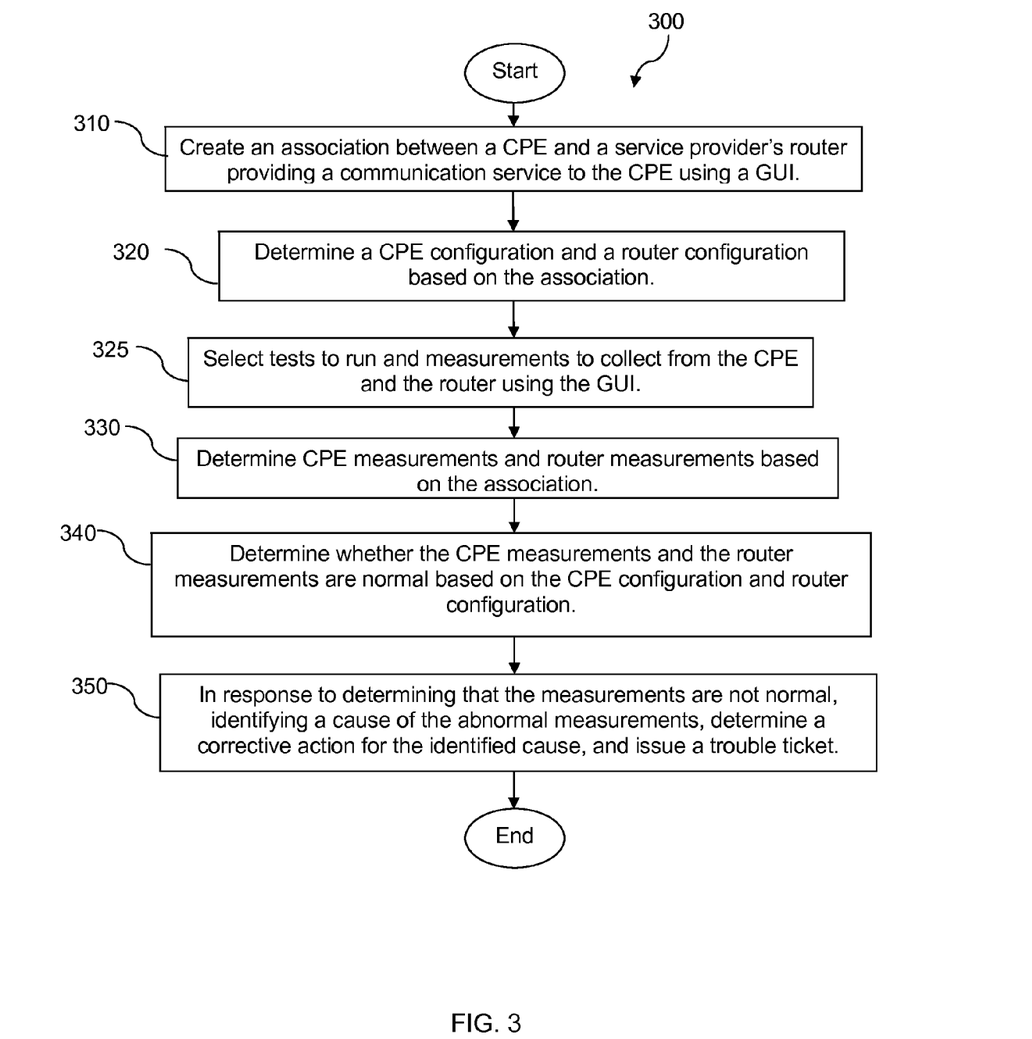
FIG. 3 illustrates an exemplary troubleshooting tool for troubleshooting a customer network.

Turning now to FIG. 3, a flowchart for a communication service troubleshooting tool 132 is described. The troubleshooting tool 132 performs the steps as described in method steps 210-250. In block 310, the troubleshooting tool 132 performs the step of creating an association between the CPE and the service provider based on a communication service. The creation of an association may be initiated by selecting, at a GUI, an identifier for CPE 102 and/or port 110 to identify the two endpoints. If CPE 102 is a managed device, then the troubleshooting tool 132 may determine the second endpoint automatically after the first endpoint is selected. Either the customer endpoint or the service provider endpoint may be selected as the first endpoint. In block 320, the troubleshooting tool 132 determines a CPE configuration of the CPE in the customer network and a router configuration of the router in the communication service provider network providing communication services to the CPE, based on the association. In an embodiment, at step 325, the service provider may use a GUI to select the types of tests to run and the measurements to collect from the two endpoints in the association. In step 330, the troubleshooting tool 132 determines CPE measurements associated with the CPE and router measurements associated with the router, based on the association. In an embodiment, the CPE measurement and router measurements are determined by initiating the tests selected in block 325. In another embodiment, the test initiated may be selected automatically according to the communication service, the value of a configuration parameter, or other information according to the SLA. The troubleshooting tool 132 then automatically performs the tests for both endpoints and collects performance metrics and generates measurement reports.

In block 340, the troubleshooting tool 132 determines whether the CPE measurements and the router measurements are normal based on the CE configuration and the router configuration. In block 350, in response to determining that the CPE measurements and the router measurements are abnormal, a cause of the abnormal measurements is identified. In an embodiment, the troubleshooting tool 132 may automatically highlight the problem and open a trouble ticket indicating the problem, the cause of the problem, and a solution based on the determined cause. The service provider may then allocate personnel to quickly correct the identified cause of the problem.

While embodiments herein have been described generally with respect to troubleshooting a communication path between CPE 102 and port 110 of the service provider's router 104, the troubleshooting tool 132 is not so limited. The troubleshooting tool 132 is contemplated for use to troubleshoot problems between any two endpoints of a communication path. In an embodiment, the endpoints may be a managed CPE and a service provider router, or even a port on the service provider's router, also referred to as a "site". In another embodiment the endpoints may be a non-managed CPE and a service provider router or port. In yet another embodiment, the endpoints may be two different customer sites with a customer wide area network (WAN). A customer WAN may have a site in one geographic location, e.g. Atlanta, and another site in another geographic location, e.g. Orlando. The customer may perceive a problem with the performance of a communication service between the two sites. In an embodiment, the troubleshooting tool 132 may determine the configurations and collect measurements for both sites, then perform analysis of the measurements of the two sites. The troubleshooting tool 132 applies a set of rules, which may be different than the set of rules for troubleshooting one site, to determine if the communication service between the two sites is performing normally or not. If the communication service between the two sites is not performing normally or as expected, the troubleshooting tool 132 may perform analysis to identify a cause for the problem and take corrective action, such as issuing a trouble ticket or allocating personnel to address the identified problem.

As described with respect to FIG. 1, the troubleshooting tool 132 further comprises a graphical user interface (GUI). The service provider may initiate troubleshooting a site or communication path 112 between two endpoints. For example, the service provider may select the first endpoint of CPE 102 and the second endpoint of port 110 by selecting at least one end of the communication path 112 at the GUI. If the device is a managed CPE, the service provider may only need to select one endpoint and the troubleshooting tool 132 may automatically determine the second endpoint. In another embodiment, the service provider may select the two endpoints for troubleshooting. The troubleshooting tool 132 then creates an association for the two endpoints. The troubleshooting tool 132 may automatically determine the configuration information for the two endpoints, and when the results are abnormal, reports the problem identified by opening a trouble ticket, for example.

In an embodiment, a customer may access the troubleshooting tool 132 via the service provider's customer portal. If the CPE is non-managed, the customer may initiate a troubleshooting session for just the customer side of the communication path 112. If the CPE is a managed device, the customer may initiate a troubleshooting session on both sides of a communication path 112. In an embodiment, the customer may view how services are configured on port 110 of service provider's router 104 regardless of whether the CPE is managed or non-managed. If the CPE is a managed device, the customer may be provided a view the configuration of the service provider's entire router 104.

Figure 4:
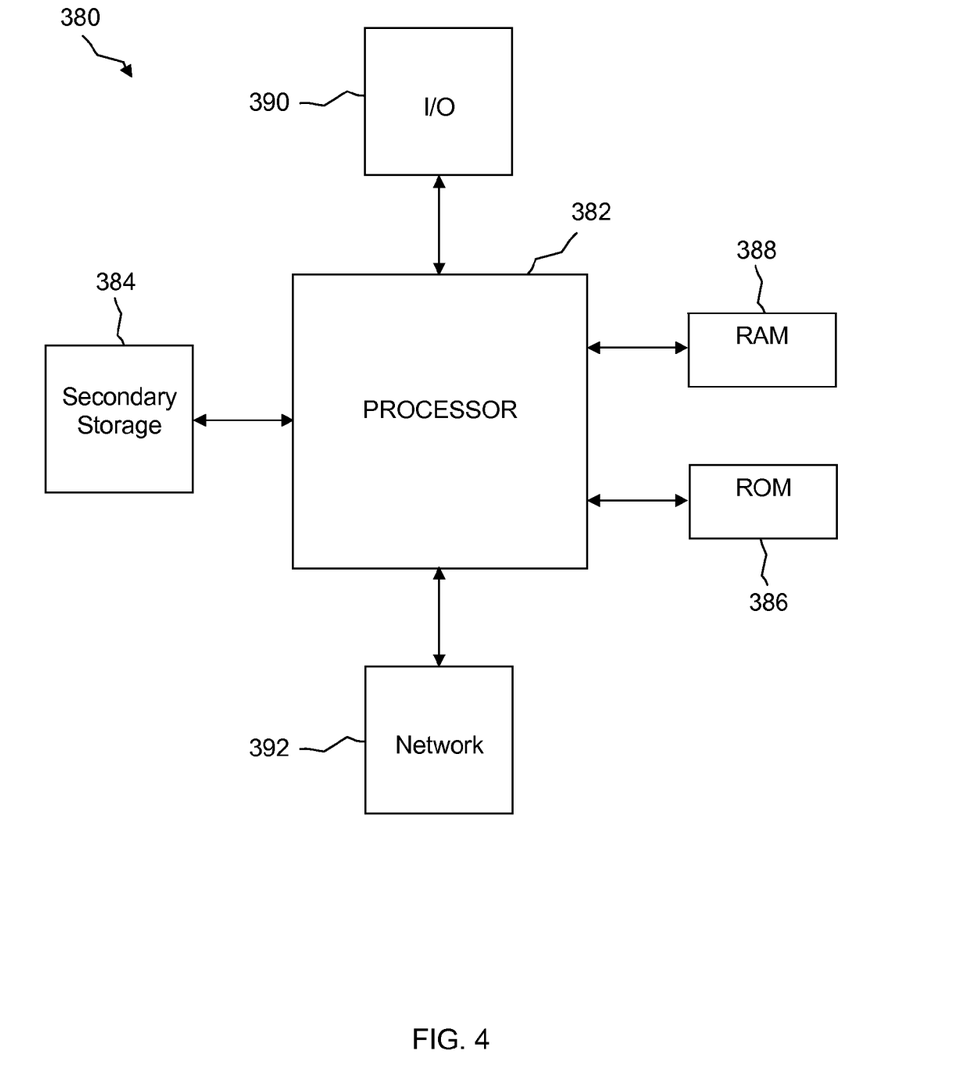
FIG. 4 illustrates an exemplary general purpose computer system suitable for implementing the several embodiments of the disclosure.

Some portions of the system 100 described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for bi-lateral data connection troubleshooting a communication service by using a communication service troubleshooting tool, comprising:
   creating, by the communication service troubleshooting tool, an association between a customer premise equipment (CPE) in a customer network and a communication service provider router providing the communication service in a communication service provider network;
   determining, by the communication service troubleshooting tool, a CPE configuration of the CPE in the customer network and a router configuration of the communication service provider router providing communication services to the CPE based on the association;
   responsive to determining the CPE configuration and router configuration, initiating, by the communication service troubleshooting tool, at least one network test on a CPE interface of the CPE in the customer network and at least one network test on a router interface of the router, each of the at least one network tests are separate and initiated simultaneously, wherein the CPE interface and the router interface are configured for the communication service;
   responsive to initiating the separate tests, generating CPE measurements based on the at least one network test on the CPE interface and router measurements based on the at least one network test on the router interface;
   collecting, by the communication service troubleshooting tool, the CPE measurements and the router measurements generated by each of the at least one test initiated on the CPE interface and the at least one test initiated on the router interface;
   determining, by the communication service troubleshooting tool, a difference between the collected CPE measurements and router measurements;
   determining, by the communication service troubleshooting tool, whether the difference exceeds a normal threshold; and
   in response to determining that the difference exceeds the normal threshold, identifying, by the communication service troubleshooting tool, a cause of the difference by applying a set of rules to verify the communication service is configured properly, wherein identifying the cause of the difference comprises identifying a configuration mismatch between the CPE configuration and the router configuration by identifying that packets are being marked incorrectly and placed into a wrong queue at the router, the packets being associated with a class of service for a customer.

2. The method of claim 1, wherein the CPE is one of a managed CPE or a non-managed CPE.

3. The method of claim 1, wherein the association between the CPE and the router is based on a port identifier, device name, device identifier, or internet protocol address.

4. The method of claim 1, wherein the CPE configuration and the router configuration include configuration information for the communication service, the configuration information comprising information for one or more of the following: Point-to-Point multilink fragmentation, class of service, encapsulation type, interface scrambling, queue type, and internet protocol subnet mask.

5. The method of claim 1, wherein collecting the CPE measurements and the router measurements generated by each of the at least one test initiated on the CPE interface and the at least one test initiated on the router interface includes:
   determining a number of input packets at the CPE and determining a number of output packets at the associated router, and
   determining a number of output packets at the CPE and determining a number of input packets at the associated router; and
   wherein the CPE measurements and the router measurements are determined bi-laterally.

6. The method of claim 1, wherein identifying the cause of the difference further comprises identifying non-conformance with a service level agreement between the customer and the communication service provider.

7. A communication service troubleshooting tool for bi-lateral data connection troubleshooting of communication services, comprising instructions stored in non-transitory memory that, upon execution by at least one processor, configure the at least one processor to:
   create an association between a customer premise equipment (CPE) and a router;
   determine a CPE configuration of the CPE in a customer network and a router configuration of the router in a communication service provider network providing communication services to the CPE based on the association;
   responsive to determination of the CPE configuration and the router configuration, initiate at least one network test on the CPE and at least one network test on the router, each of the at least one network tests are separate, wherein the at least one network test on the CPE generates CPE measurements and the at least one network test on the router interface generates router measurements;

collect CPE measurements associated with the CPE and router measurements associated with the router based on the association;

determine whether the CPE measurements and the router measurements are normal based on an analysis of the CPE configuration and the router configuration; and in response to a determination that the CPE measurements and the router measurements are not normal, identify a cause of the abnormal measurements, wherein the identification of the cause of the abnormal measurements comprise identification of a configuration mismatch between the CPE configuration and the router configuration by identification that packets are being marked incorrectly and placed into a wrong queue at the router, the packets being associated with a class of service for a customer.

8. The communication service troubleshooting tool of claim 7, wherein the CPE is one of a managed CPE or a non-managed CPE.

9. The communication service troubleshooting tool of claim 7, wherein the association between the CPE and the router is based on a port identifier, device name, device identifier, or internet protocol address.

10. The communication service troubleshooting tool of claim 7, wherein the CPE configuration and the router configuration include configuration information for the communication service, the configuration information comprising information for one or more of the following: Point-to-Point multilink fragmentation, class of service, encapsulation type, interface scrambling, queue type, and internet protocol subnet mask.

11. The communication service troubleshooting tool of claim 7, wherein the collection of the CPE measurements and the router measurements further comprises one of:
  a determination of a number of input packets at the CPE and a determination of a number of output packets at the associated router, and
  a determination of a number of output packets at the CPE and a determination of a number of input packets at the associated router; and
  wherein the CPE measurements and the router measurements are determined bi-laterally.

12. The communication service troubleshooting tool of claim 7, wherein the identification of the cause of abnormal measurements further comprises identification of non-conformance with a service level agreement between the customer and the communication service provider.

13. A system for bi-lateral data connection troubleshooting a communication service by using a communication service troubleshooting tool, comprising:
  a customer premises equipment (CPE) comprising a CPE interface that is configured for the communication service, wherein the CPE resides in a customer network;
  a router comprising a router interface that is configured for the communication service, wherein the router resides in a communication service provider network, the router providing the communication service to the CPE;
  a communication service troubleshooting tool that, upon execution of at least one processor, the communication service troubleshooting tool:
    creates an association between the CPE and the router;
    determines a CPE configuration of the CPE in the customer network and a router configuration of the router in the communication service provider network providing communication services to the CPE based on the association;
    responsive to determination of the CPE configuration and the router configuration, initiates at least one network test on the CPE interface and at least one network test on the router interface, each of the at least one network tests are separate, wherein the at least one network test on the CPE interface generates CPE measurements, and the at least one network test on the router interface generates router measurements;
    collects the CPE measurements associated with the CPE and the router measurements associated with the router based on the association;
    determines whether the CPE measurements and the router measurements are normal based on an analysis of the CPE configuration and the router configuration; and
    in response to a determination that the CPE measurements and the router measurements are not normal, identifies a cause of the abnormal measurements that comprises identification of a configuration mismatch between the CPE configuration and the router configuration by identification that packets are being marked incorrectly and placed into a wrong queue at the router, the packets being associated with a class of service for a customer.

14. The system of claim 13, further comprising:
  another CPE residing in the customer network, wherein the customer network is a wide area network; and
  wherein the communication service troubleshooting tool further:
    creates an association between the CPE and the other CPE;
    determines the CPE configuration of the CPE in the customer network and another CPE configuration the other CPE in the customer network;
    determines CPE measurements associated with the CPE and other CPE measurements associated with the other CPE based on the association;
    determines whether the CPE measurements and the other CPE measurements are normal based on an analysis of the CPE configuration and the other CPE configuration; and
    in response to determining that the CPE measurements and the other CPE measurements are abnormal, identifies a cause of the abnormal measurements.

15. The system of claim 13, wherein the association between the CPE and the router is based on a port identifier, device name, device identifier, or internet protocol address.

16. The system of claim 13, wherein the CPE configuration and the router configuration include configuration information for the communication service, the configuration information comprising information for one or more of the following: Point-to-Point multilink fragmentation, class of service, encapsulation type, interface scrambling, queue type, and internet protocol subnet mask.

17. The system of claim 13, wherein the collection of the CPE measurements and the router measurements further comprises one of:
  determination of a number of input packets at the CPE and determination of a number of output packets at the associated router, and
  determination of a number of output packets at the CPE and determination of a number of input packets at the associated router; and wherein the CPE measurements and the router measurements are determined bi-laterally.

18. The system of claim 13, wherein identification of the cause of abnormal measurements further comprises identification of non-conformance with a service level agreement between the customer and the communication service provider.

* * * * *